US012724910B2

(12) United States Patent
Hall et al.

(10) Patent No.: US 12,724,910 B2
(45) **Date of Patent: *Sep. 1, 2026**

(54) CONTAINERIZED BUILD STEPS

(71) Applicant: Google LLC, Mountain View, CA (US)

(72) Inventors: Jason Hall, Brooklyn, NY (US); David Bendory, Livingston, NJ (US); John Asmuth, Rutherford, NJ (US); Scott Zawalski, New York, NY (US); David Dopson, New York, NY (US)

(73) Assignee: Google LLC, Mountain View, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/812,086

(22) Filed: Aug. 22, 2024

(65) Prior Publication Data

US 2024/0411916 A1 Dec. 12, 2024

Related U.S. Application Data

(63) Continuation of application No. 18/469,549, filed on Sep. 18, 2023, now Pat. No. 12,072,997, which is a continuation of application No. 17/177,150, filed on Feb. 16, 2021, now Pat. No. 11,790,101, which is a continuation of application No. 17/020,771, filed on
(Continued)

(51) Int. Cl.

| | |
|---|---|
| ***G06F 21/62*** | (2013.01) |
| ***G06F 8/41*** | (2018.01) |
| ***G06F 8/60*** | (2018.01) |
| ***G06F 8/70*** | (2018.01) |
| ***G06F 21/31*** | (2013.01) |

(52) U.S. Cl.
CPC .......... *G06F 21/6218* (2013.01); *G06F 8/433* (2013.01); *G06F 8/447* (2013.01); *G06F 8/60* (2013.01); *G06F 8/70* (2013.01); *G06F 21/31* (2013.01); *G06F 21/629* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 9,342,273 | B1 | 5/2016 | Kumar et al. |
| 2003/0182625 | A1 | 9/2003 | Davidov et al. |

(Continued)

OTHER PUBLICATIONS

USPTO. Office Action relating to U.S. Appl. No. 17/177,150, dated Feb. 17, 2023.

*Primary Examiner* — Simon P Kanaan
(74) *Attorney, Agent, or Firm* — Shumaker & Sieffert, P.A.

(57) ABSTRACT

A method includes receiving a build request containing build step instructions from a user. The build step instructions specify a usage of containers within memory hardware for building an output container. The containers include at least one private container having private contents and/or at least one public container having public contents. The method also includes authenticating the user initiating the build request and determining whether the user is authorized to access the private containers. When the user is authenticated and authorized to access the private containers, the method includes obtaining the containers specified by the build step instructions from the memory hardware, executing the build step instructions to build the output container while using the received containers, and outputting the built output container.

20 Claims, 11 Drawing Sheets

Related U.S. Application Data

Sep. 14, 2020, now Pat. No. 10,949,562, which is a continuation of application No. 16/426,447, filed on May 30, 2019, now Pat. No. 10,789,381, which is a continuation of application No. 15/269,411, filed on Sep. 19, 2016, now Pat. No. 10,339,332.

(56) References Cited

U.S. PATENT DOCUMENTS

| | | | |
|---|---|---|---|
| 2010/0122343 A1 | 5/2010 | Ghosh et al. | |
| 2015/0065098 A1 | 3/2015 | Pfau | |
| 2016/0170743 A1 | 6/2016 | Shmulevich et al. | |
| 2016/0246992 A1* | 8/2016 | Brutschy | G06F 21/6245 |
| 2016/0253172 A1 | 9/2016 | Shani et al. | |
| 2016/0301676 A1 | 10/2016 | Gounares | |
| 2017/0177860 A1 | 6/2017 | Suarez et al. | |
| 2017/0177877 A1 | 6/2017 | Suarez et al. | |
| 2017/0249128 A1 | 8/2017 | Fojtik et al. | |
| 2017/0359331 A1 | 12/2017 | Bonnet et al. | |
| 2018/0115585 A1 | 4/2018 | Rubakha | |
| 2025/0238541 A1* | 7/2025 | Yajnik | G06F 21/6218 |

* cited by examiner

CONTAINERIZED BUILD STEPS

CROSS REFERENCE TO RELATED APPLICATIONS

This U.S. Patent Applications is a continuation of, and claims priority under 35 U.S.C. § 120 from, U.S. patent application Ser. No. 18/469,549, filed on Sep. 18, 2023, which is a continuation of U.S. patent application Ser. No. 17/177,150, now U.S. Pat. No. 11,790,101, filed on Feb. 16, 2021, which is a continuation of U.S. patent application Ser. No. 17/020,771, now U.S. Pat. No. 10,949,562, filed on Sep. 14, 2020, which is a continuation of U.S. patent application Ser. No. 16/426,447, now U.S. Pat. No. 10,789,381, filed on May 30, 2019, which is a continuation of U.S. patent application Ser. No. 15/269,411, now U.S. Pat. No. 10,339,332, filed on Sep. 19, 2016. The disclosures of these prior applications are considered part of the disclosure of this application and are hereby incorporated by reference in their entireties.

TECHNICAL FIELD

This disclosure relates to using build step instructions that specify a usage of at least one private container for building an output container.

BACKGROUND

Container technologies offer prospects of rapidly scaling applications and services without incurring the large overhead associated with traditional virtualization environments. Generic builders are publicly available for building an output container from input source code. These generic builders generally include instructions and build tools that describe how to package the source code into a corresponding container for deployment. The generic builders prevent developers, however, from using proprietary build tools to build the output container. As a result, developers that want to use proprietary build tools for building an output container are left with the option of packaging and building the output container locally. Moreover, generic builders produce heavyweight output containers that contain both the build-time tools, such as software development kits, compilers, and/or debuggers, as well as the run-time environment for executing the output container. These heavyweight output containers are larger and contain unnecessary contents/components when deployed/distributed to customers. For instance, including a compiler in a deployed container is unnecessary as it adds heft to the container as well as introduces attack vectors and security vulnerabilities to packaged deployments.

SUMMARY

One aspect of the disclosure provides a method for building an output container. The method includes receiving, at data processing hardware, a build request containing build step instructions from a user. The build step instructions specify a usage of containers within memory hardware for building an output container. The containers include at least one private container having private contents and/or at least one public container having public contents. The method further includes authenticating, by the data processing hardware, the user initiating the build request and determining, by the data processing hardware, whether the user is authorized to access the private containers. When the user is authenticated and authorized to access the private containers, the method includes executing, by the data processing hardware, the build step instructions to build the output container while using the obtained containers and outputting, by the data processing hardware, the built output container.

Implementations of the disclosure may include one or more of the following optional features. In some implementations, the private contents of the private container include a proprietary software development kit for use in building the output container. The built output container may include contents that exclude the proprietary software development kit.

In some examples, the build step instructions specify a series of build steps required to execute for building the output container. Each build step may be associated with at least one of the obtained containers and include a unique identifier. The build step instructions may define an order of execution for executing the build steps in succession. Each successive build step may commence to execute after execution of an immediately prior build step is complete. One or more of the build steps may include a corresponding dependency constraint. The dependency constraint may specify the unique identifier of a prior build step that must complete execution before the corresponding build step commences to execute.

The method may also include determining, by the data processing hardware, whether two or more of the build steps include dependency constraints specifying the same unique identifier. When at least two of the build steps include dependency constraints specifying the same unique identifier, the method may include executing, by the data processing hardware, the at least two build steps in parallel after execution of the prior build step associated with the specified unique identifier is complete. Executing the build step instructions may also include executing at least two build steps in parallel to build corresponding output build results and merging the built output build results to build the output container. Each build step may be associated with one of the obtained containers. Executing the build step instructions may also include executing a compiling build step to build executable code of a software distribution from input source code and executing a packaging build step that packages the executable code from the compiling build step into a deployment container. The compiling build step may use a software development kit to build the executable code. The deployment container may contain a runtime environment for executing the executable code while excluding the software development kit.

In some examples, the method may include receiving, at the data processing hardware, a pull request from the user to view the deployment container and transmitting, by the data processing hardware, the deployment container to a user device associated with the user. The pull request may include a container identifier associated with the deployment container. The user device may be configured to execute the deployment container. Prior to executing the packaging build step, the method may include executing, by the data processing hardware, a unit test build step to determine whether the executable code satisfies operation requirements of the software distribution. The packaging build step may execute when the unit test build step determines the executable code satisfies the operation requirements.

In some implementations, the method includes storing, by the data processing hardware, the built output container in a secure container system for executing a corresponding secure execution environment for contents of the built output container. The contents of the output container may be associated with execution of a software application. The method may also include receiving, at the data processing hardware, an access request from one or more client devices in communication with the data processing hardware to obtain the software application and distributing the built output container from the data processing hardware to the one or more client devices. Each access request may include an application identifier associated with the software application.

The method may also include receiving, at the data processing hardware, a status request from the user requesting a status of each of a series of build steps associated with the build step instructions, obtaining, by the data processing hardware, the status of each of the build steps, and transmitting a status notification from the data processing hardware to a user device associated with the user. The status notification may indicate the status of each build step. The status of each corresponding build step may indicate one of: execution of the corresponding build step is complete; execution of the corresponding build step has failed; execution for the corresponding build step is currently in progress; or the corresponding build step is currently waiting to execute. In some implementations the status request from the user requests a status of the build step instructions. In these implementations, the method includes obtaining, by the data processing hardware, the status of the build step instructions and transmitting a status notification from the data processing hardware to the user device associated with the user. Here, the status notification indicates the status of the build step instructions. The status of the build step instructions may indicate one of: execution of the build step instructions is complete; execution of the build step instructions has failed; execution for the build step instructions is currently in progress; or the build step instructions are currently waiting to execute.

In some examples, the built output container includes a container identifier associated with the output container and a build step record including at least one of a series of build steps specified by the build step instructions, the usage of the obtained containers during each build step, the order of execution of the build steps, a start timestamp indicating a time when execution of each build step began, an end timestamp indicating a time when execution of each build step completed, or contents of each build result output after executing the corresponding build step.

Another aspect of the disclosure provides a system for building an output container. The system includes data processing hardware of a distributed system and memory hardware in communication with the data processing hardware. The memory hardware stores instructions that when executed on the data processing hardware cause the data processing hardware to perform operations. The operations include: receiving a build request containing build step instructions from a user that specify a usage of containers within the memory hardware for building an output container; authenticating the user initiating the build request; and determining whether the user is authorized to access the private containers. The at least one private container requires a user authorization for accessing the private contents. When the user is authenticated and authorized to access the private containers, the method includes obtaining the containers specified by the build step instructions from the memory hardware; executing the build step instructions to build the output container while using the obtained containers; and outputting the built output container.

This aspect may include one or more of the following optional features. In some implementations, the private contents of the private container includes a proprietary software development kit for use in building the output container. The built output container may include contents that exclude the proprietary software development kit.

In some examples, the build step instructions may specify a series of build steps required to execute for building the output container. Each build step may be associated with at least one of the obtained containers and including a unique identifier. The build step instructions may define an order of execution for executing the build steps in succession. Each successive build step may commence to execute after execution of an immediately prior build step is complete. One or more of the build steps may include a corresponding dependency constraint. The dependency constraint may specify the unique identifier of a prior build step that must complete execution before the corresponding build step commences to execute.

The operations may also include determining whether two or more of the build steps include dependency constraints specifying the same unique identifier. When at least two of the build steps include dependency constraints specifying the same unique identifier, the method may include executing the at least two build steps in parallel after execution of the prior build step associated with the specified unique identifier is complete. Executing the build step instructions may also include executing at least two build steps in parallel to build corresponding output build results and merging the built output build results to build the output container. Each build step may be associated with one of the obtained containers.

Executing the build step instructions may further include executing a compiling build step to build executable code of a software distribution from input source code and executing a packaging build step that packages the executable code from the compiling build step into a deployment container. The compiling build step may use a software development kit to build the executable code. The deployment container may contain a runtime environment for executing the executable code while excluding the software development kit.

In some examples, the operations include receiving a pull request from the user to view the deployment container and transmitting the deployment container to a user device associated with the user. The pull request may include a container identifier associated with the deployment container. The user device may be configured to execute the deployment container. The operations may also include, prior to executing the packaging build step, executing a unit test build step to determine whether the executable code satisfies operation requirements of the software distribution, wherein the packaging build step executes when the unit test build step determines the executable code satisfies the operation requirements.

In some examples, the operations include storing the built output container in a secure container system for executing a corresponding secure execution environment for contents of the built output container. The contents of the output container may be associated with execution of a software application. The operations may also include receiving an access request from one or more client devices in communication with the data processing hardware to obtain the software application and distributing the built output container from the data processing hardware to the one or more client devices. Each access request may include an application identifier associated with the software application.

In some implementations, the operations include receiving a status request from the user requesting a status of each of a series of build steps associated with the build step instructions, obtaining the status of each of the build steps, and transmitting a status notification from the data processing hardware to a user device associated with the user. The status notification may indicate the status of each build step. The status of each corresponding build step may indicate one of: execution of the corresponding build step is complete; execution of the corresponding build step has failed; execution for the corresponding build step is currently in progress; or the corresponding build step is currently waiting to execute. In other implementations, the status request from the user requests a status of the build step instructions. In these implementations, the method includes obtaining the status of the build step instructions and transmitting a status notification from the data processing hardware to the user device associated with the user. Here, the status notification indicates the status of the build step instructions. The status of the build step instructions may indicate one of: execution of the build step instructions is complete; execution of the build step instructions has failed; execution for the build step instructions is currently in progress; or the build step instructions are currently waiting to execute.

The built output container may include a container identifier associated with the output container and a build step record including at least one of a series of build steps specified by the build step instructions the usage of the obtained containers during each build step, the order of execution of the build steps, a start timestamp indicating a time when execution of each build step began, an end timestamp indicating a time when execution of each build step completed, or contents of each build result output after executing the corresponding build step.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Generic container builders are publically available for building software by building an output container from input source code. While these generic container builders are suitable for packaging built source code, such container builders require the use of generic build steps that describe how to package the built source code. As a result, developers are left with little flexibility when building output containers for software applications/services. Implementations herein are directed toward using a set of build steps that are each containerized so that developers are free to use their own proprietary tools for building, testing, and/or packaging source code for deployment. Accordingly, a build step process may chain these containerized build steps together into a pipeline to generate a lean output container for deployment that eliminates the heft of unnecessary components, such as compilers that are susceptible to attack vectors and security vulnerabilities. For instance, a series of containerized build steps may be changed together to first compile source code using public/proprietary build tools (e.g., compilers and/or debuggers), then perform a unit test build step to confirm whether or not built binaries of the compiled source code are acceptable, and then package the built binaries into a lean runtime-only container for deployment.

Figure 1:
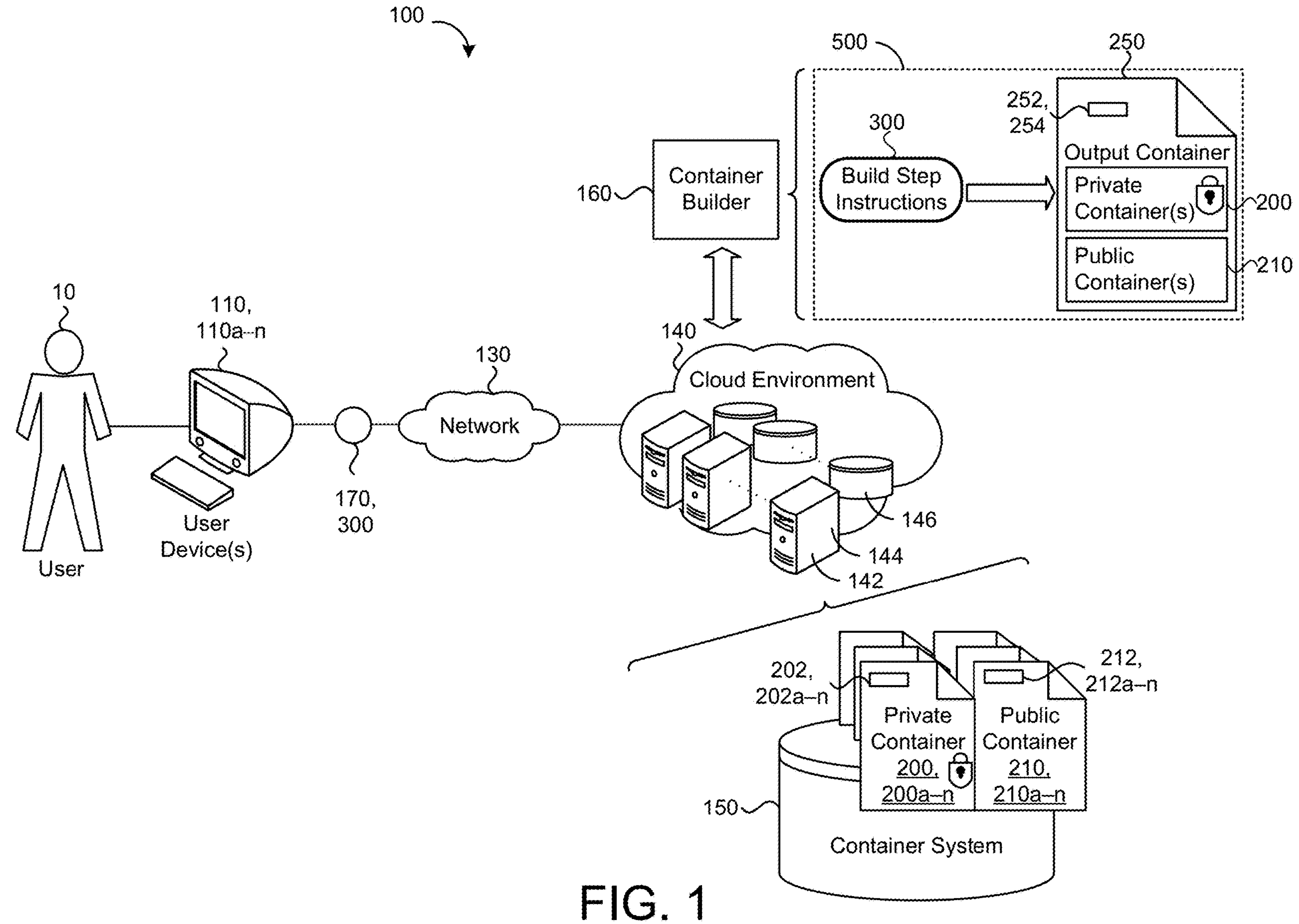
FIG. 1 is a schematic view of an example system for building an output container from build step instructions.
Figure 9:
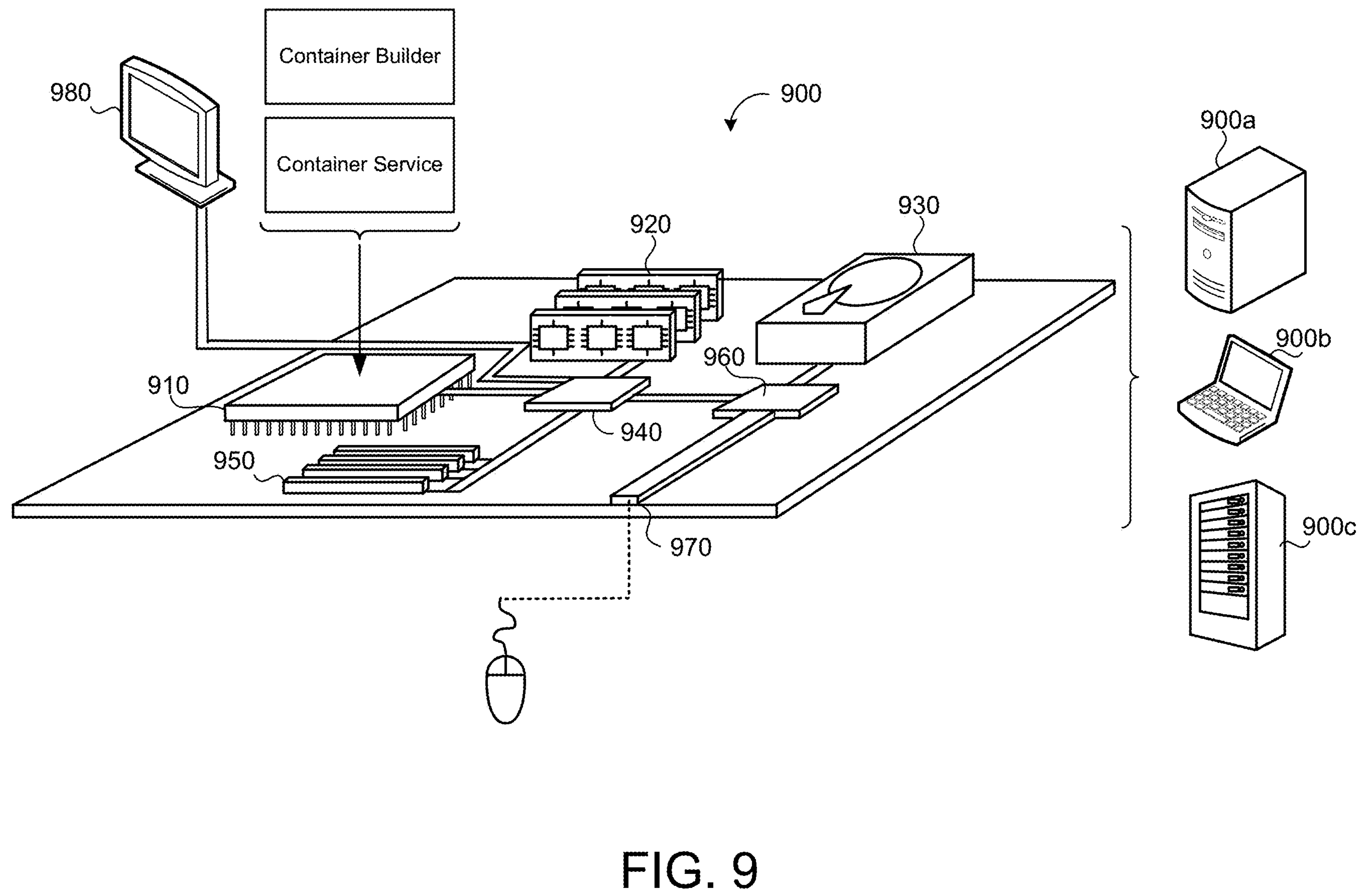
FIG. 9 is a schematic view of an example computing device executing a container builder and a container service.

Referring to FIG. 1, in some implementations, a system 100 includes a user device 110*a-n* associated with a user 10, who may communicate, via a network 130, with a remote system 140. The remote system 140 may be a distributed system (e.g., cloud environment) having scalable/elastic resources 142. The resources 142 include computing resources 144 and/or storage resources 146. In some implementations, the remote system 140 executes a container system 150 having one or more private containers 200, 200*a-n* and one or more public containers 210, 210*a-n* within memory hardware 920 (FIG. 9). In some examples, the container system 150 is associated with one or more private registries containing the private containers 200 and/or one or more public registries containing the public containers 210. The container system 150 may also be referred to as a "Container Registry". The remote system 140 also executes a container builder 160 for building an output container 250 based on a usage of at least one of the private containers 200 and/or at least one of the public containers 210 of the secure container system 150.

The output container 250 includes a container image that may include a software application 254. A software application (i.e., a software resource) may refer to computer software that causes a computing device (e.g., data processing hardware 900 (FIG. 9)) to perform a task. Thus, the software application 254 may correspond to any type or form of software, file, and/or executable code that may be installed, run, deployed, and/or otherwise implemented on the distributed system 140. In some examples, a software application may be referred to as an "application," an "app," or a "program." Example applications include, but are not limited to, system diagnostic applications, system management applications, system maintenance applications, word processing applications, spreadsheet applications, messaging applications, web browser applications, media streaming applications, social networking applications, security applications, and gaming applications. The output container 250 may refer to a computing environment which, during execution, at least partially isolates the application's 254 view of an underlying operating system and/or resources. The container image associated with the output container 250 may contain the software application 254 for deployment as a service in the remote system 140.

The user devices 110 can be any computing devices capable of communicating with the container builder 160 through the network 130. The user devices 110 include, but are not limited to, desktop computing devices and mobile computing devices, such as laptops, tablets, smart phones, and wearable computing devices (e.g., headsets and/or watches). The user devices 110 may correspond to users/customers 10 of the remote system 140 that develop, build, and deploy output containers 250 associated with software applications 254 executing on the remote system 140.

The container system 150 receives the private containers 200 having private contents 202 and the public containers 210 having public contents 212. The private contents 202 of the private containers 200 may include proprietary content owned by the user 10 for use in building the output container 250 that is protected from access and inspection by the public. In some implementations, each private container 200 requires a user authorization for accessing the corresponding private contents 202 while the contents 212 associated with the one or more public containers 210 are publicly accessible. As used herein, each private container 200 may refer to a secure container that executes a secure execution environment for the private contents 202 of the corresponding private container 200. Accordingly, the terms "secure container" and "private container" may be used interchangeably herein. The private containers 200 are configured to keep unauthorized users from accessing and viewing the private content 202 that may include proprietary code and/or proprietary data associated with the output container 250. Thus, the private content 202 may contain proprietary build tools that are exclusive to the user 10 for use in building the output container 250 and protected from the public when the output container 250 is stored in the container system 150 and/or deployed to one or more client devices 810 (FIG. 8) for execution of the software application 254 on the distributed system 140. Here, the output container 250 packages the software application 254 in a complete file system containing everything needed to execute, e.g., code, runtime, system tools, and libraries, such that the applications 254 is able to execute consistently regardless of the operating environment.

In some examples, the container builder 160 receives a build request 170 containing build step instructions 300 from the user device 110. The build step instructions 300 specify a usage of the received containers 200, 210 of the container system 150 for building the output container 250. The container builder 160 may authenticate the user 10 (e.g., user device) initiating the build request 170 via the user device 110 and determine whether the user 10 is authorized to access the private containers 200 of the container system 150. In some examples, the container system 150 provides an authenticate/authorize user notification 414 (FIG. 4A) to the container builder 160 when the user device 110 (e.g., user 10) is authenticated and authorized to access the private containers 200. In some implementations, the container builder 160 executes a build step process 500 that executes the build step instructions 300 to build the output container 250 while using the received containers 200, 210 specified by the instructions 300. Thereafter, the build step process 500 outputs the built output container 250 and the container builder 160 may push 418 (FIG. 4B) the output container 250 to the container system 150 within the memory hardware 920. The output container 250 may include contents 252 associated with execution of the software application 254 on the distributed system 140. Here, the output container 250 may be private and secure such that only authorized users 10 are permitted to access and view the contents 252 of the output container 250 while executing on the remote system 140.

The public containers 210 may include public container images such as, for example DOCKER® "images". In some examples, the public containers 210 are associated with DOCKER® containers and in the context of a Linux operating system. However, one or more of the public containers 210 may be supported by other container applications and by other operating systems.

Figure 2:
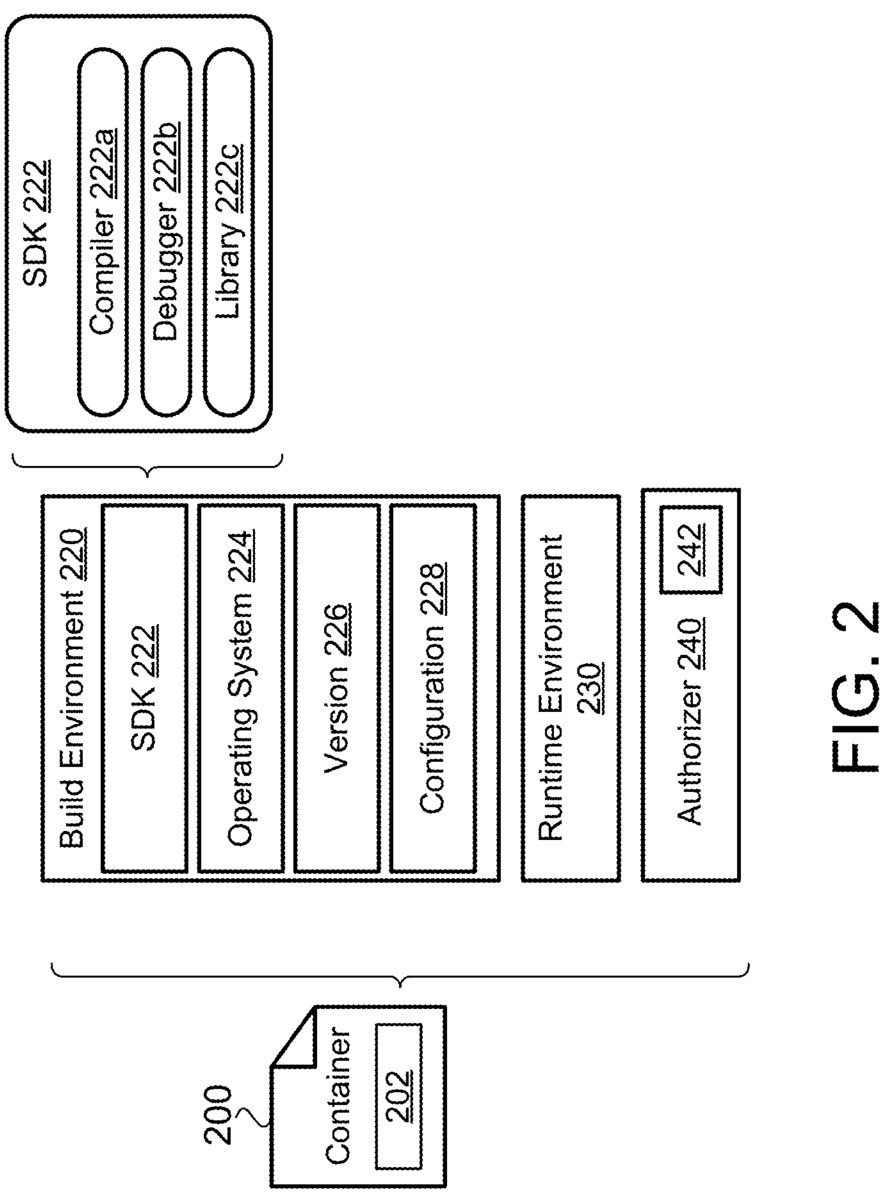
FIG. 2 is a schematic view of private contents of an example private container.

Referring to FIG. 2, in some implementations, the private contents 202 of each private container 200 include a build environment 220, a runtime environment 230, and an authorizer field 240. The public contents 212 of each public container 210 may also include a corresponding build environment and runtime environment. The build environment 210 includes data structures and/or configurations used to build the corresponding container 200. For instance, the build environment 210 may include a software development kit (SDK) 222 and specify an operating system 224, a version 226 and a configuration 228 for the corresponding container 200. In some examples, the SDK 222 of the private container 200 is associated with a proprietary tool chain owned by the user 10 for use in building the output container 250. Since the private container 200 contains the SDK 222, user authorization is required for accessing or inspecting the SDK 222 owned by the user 10. The SDK 222 may include, without limitation, a compiler 222*a*, a debugger 222*b*, and/or library 222*c* associated with the corresponding private container 200. In some implementations, the configuration 228 includes the data structures or configurations used to build the corresponding container 200 during execution. For instance, the configuration 228 may be associated with instructions for building the container 200.

In some examples, the runtime environment 230 includes a virtual machine for executing code (e.g., binary code) to run the private container 200. The runtime environment 230 may allow the private container 200 to execute to test the code contained in the container 200 for bugs so that debugging can be performed before deploying the container 200 and/or using the container 200 to build another container.

In some implementations, the authorizer 240 identifies users 10 authorized for accessing the private contents 202 of the corresponding private container 200. The authorizer 240 may define what permissions an authenticated user 10 has on the private contents 202 of the container 200. FIG. 2 shows the authorizer 240 containing one or more authorization identifiers 242 associated with users 10 authorized for accessing the private contents 202. The authorization identifiers 242 may be associated with a service account of an entity that owns the proprietary contents 202 protected by the container 200. Additionally or alternatively, at least one authorization identifier 242 may be associated with a user account for a user 10 having the required user authorization for accessing the private contents 202.

Figure 3:
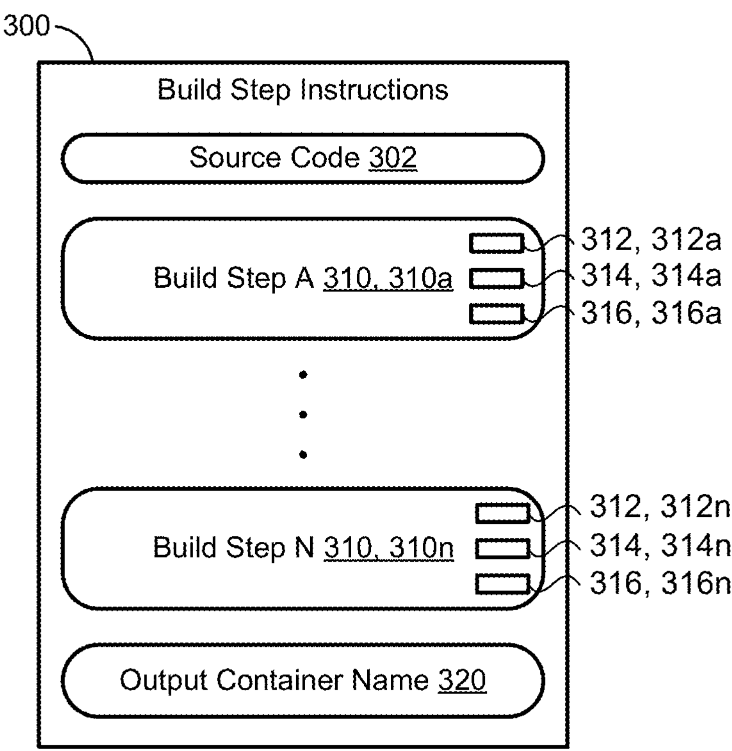
FIG. 3 is a schematic view of an example set of build step instructions for building an output container.

Referring to FIG. 3, in some implementations, the build step instructions 300 received from the user device 110 specify a usage of the received containers 200, 210 for building the output container 250. The build step instructions 300 include a source code field 302, one or more build steps 310, 310*a-n*, and an output container identifier 320 identifying the output container 250 that is built after the build step instructions 300 execute. In some examples, the source code field 302 identifies source code associated with the software application 254 of the output container 250. For instance, the source code field 302 may identify a location of the source code for use by one or more of the build steps 310 in building the output container 302. In some examples, the source code is stored in remote memory hardware 920 and accessible to the container builder 160 while executing the build step process 500 to build the output container 250.

The container builder 160 executes (e.g., via one or more virtual machines) the build steps 310, 310*a-n* to build the output container 250. Each build step 310 may be containerized and associated with at least one of the received private containers 200 and/or the received public containers 210 to produce a corresponding build result 225 (FIGS. 5A-5C and 6A-6C) when the build step 310 executes. As used herein, the term "build result" may refer to a container image including static data defining the corresponding build step 310 and the components thereof. Thus, each build step 310 may execute to build a corresponding container image.

Each build step 310 may include a received container identifier 312, 312*a-n*, an argument/environment field 314, 314*a-n*, and a dependency constraint 316, 316*a-n*. The received container identifier 312 identifies one of the received private containers 200 or received public containers 210 associated with the corresponding build step 312. For instance, the received container identifier 312 may identify a private container 200 containing a proprietary SDK 222 having a compiler 222*a* for compiling the source code 302 into executable code during execution of the corresponding build step 310. On the other hand, the received container identifier 312 may identify a public container 210 containing a publically accessible configuration 228, such as a dockerfile, that defines components and an order of execution of those components when the corresponding build step 310 executes. Thus, one or more of the build steps 310 may be proprietary and unique to the user 10 for use in combination with one or more of the other build steps 310 may be publically accessible to build the corresponding output container 250. In some examples, the argument/environment field 314 defines arguments for the corresponding build step 310 and an environment for executing the corresponding build step 310. The arguments and environment may pass to the corresponding build result 225 (e.g., container image) built when the corresponding build step 310 executes.

In some examples, the build step instructions 300 list define an order of execution for executing the build steps 310 in succession. Here, each successive build step 310 may begin executing after execution of an immediately prior build step 310 is complete. In some implementations, the dependency constraint 316 specifies a unique identifier associated with a prior build step 310 that must complete execution before commencing execution of the corresponding build step 310. In other words, the dependency constraint 316 may instruct a corresponding build step 310 to "wait for" execution of one or more of the prior build steps 310 to complete before the corresponding build step 310 is permitted to execute. In scenarios when the dependency constraint 316 does not specify any unique identifiers of prior build steps to "wait for", then execution of the corresponding build step 310 is dependent upon every prior build step 310 completing execution. Two or more build steps 310 may execute in parallel when the corresponding dependency constraints 316 specify the same unique identifier of a prior build step. Accordingly, the user 10 may chain the series of build steps 310, 310*a-n* together in a user defined pipeline for execution during the build step process 500.

Figure 4A:
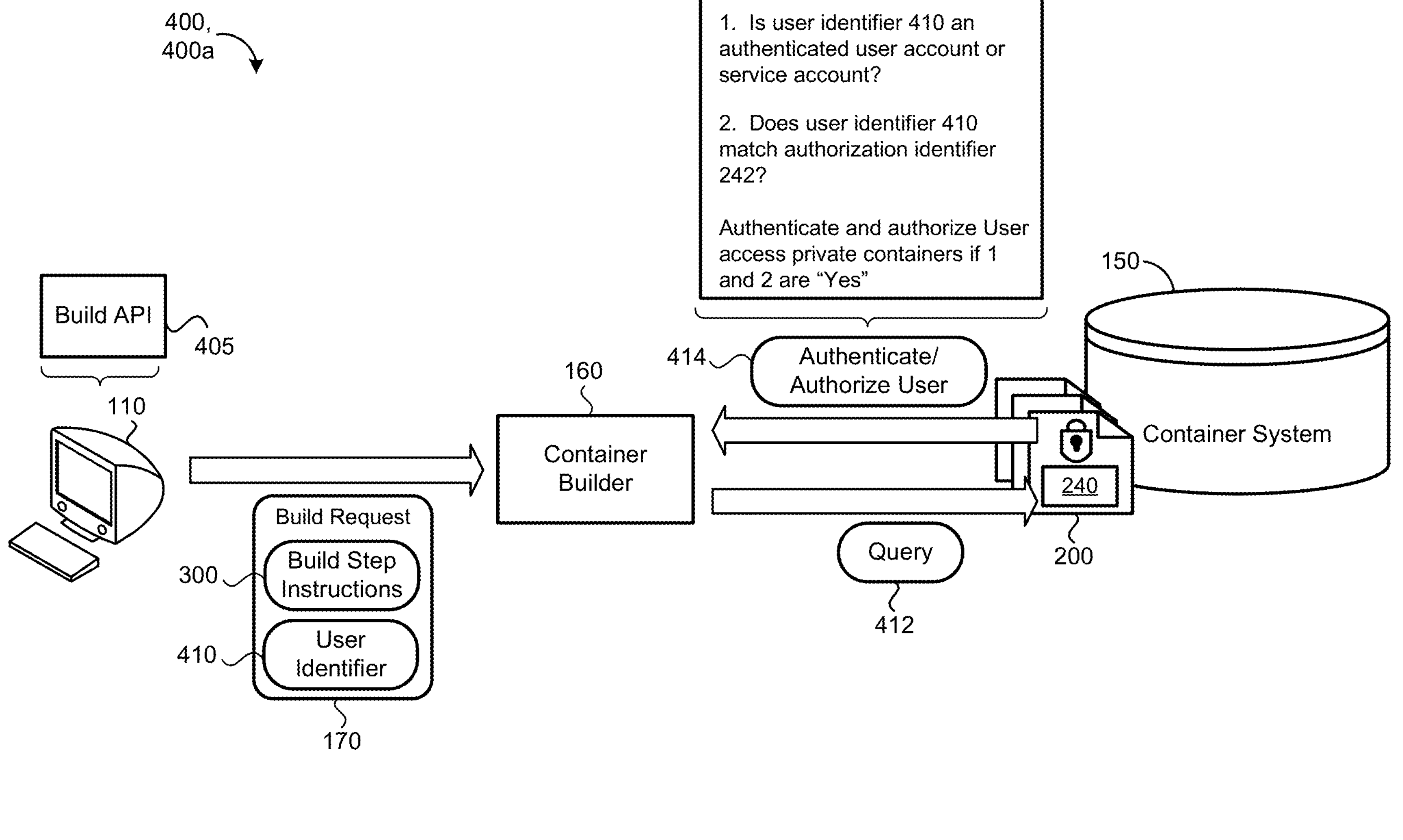
FIGS. 4A and 4B show schematic views of a container builder authorizing/authenticating a user initiating a build request containing build step instructions and executing the build step instructions to build an output container.
Figure 4B:
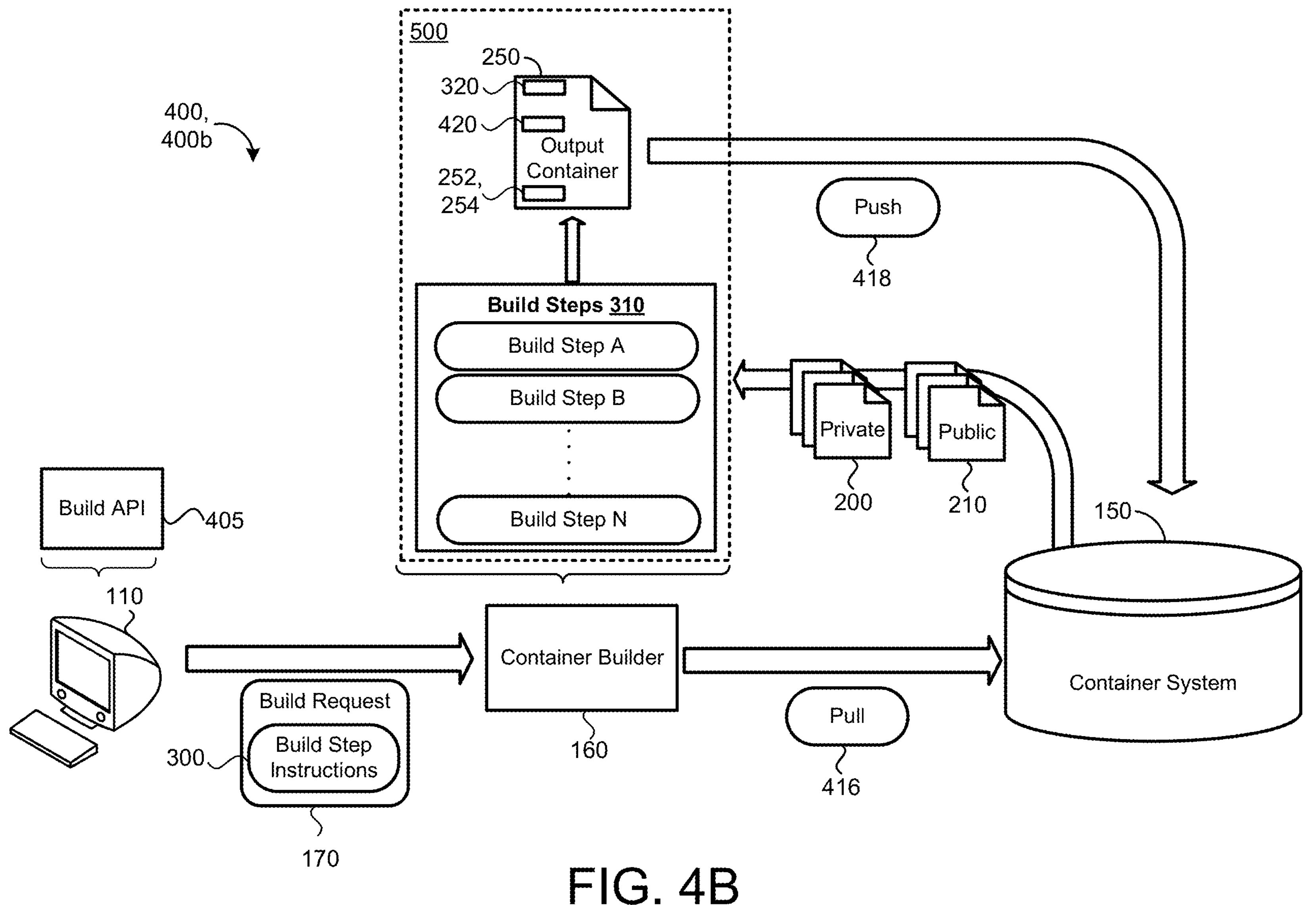

FIGS. 4A and 4B show schematic views 400*a*, 400*b* of a container builder 160 authorizing/authenticating a user device 110 initiating a build request 170 containing build step instructions 300 and executing the build step instructions 300 during a build step process 500 to build an output container 250. The user device 110 executes a build application programming interface (API) 405 to transmit the build request 170 to the container builder 160. Referring to FIG. 4A, the build request 170 includes a user identifier 410 and the build step instructions 300 specifying the usage of the received containers 200, 210 for building the output container 250. The container builder 160 uses the user identifier 410 to authenticate the user device 110. For instance, the user identifier 410 may be associated with an authenticated user account or service account of the container system 150.

Additionally, the container builder 160 uses the user identifier 410 to determine whether the user device 110 is authorized to access the private contents 202 associated with one or more private containers 200 specified by the build step instructions 300. In some implementations, the container builder 160 queries 412 the container system 160 using the user identifier 410 to determine whether the user device 110 is authorized to access the private containers 200 specified by the build step instructions 300. The container system 160 determines whether or not the authorizer 240 (FIG. 2) of each specified private container 200 includes a corresponding authorization identifier 242 (FIG. 2) that matches the user identifier 410. FIG. 4A shows the container builder 160 receiving an authenticate/authorization notification 414 from the container system 150 that indicates whether or not the user device 110 is authenticated and authorized to access the private containers 200 specified in the build step instructions 300. In some examples, the user device 110 is authenticated and authorized when the user identifier 410 is associated with an authenticated user/service account and the user identifier 410 matches each authorization identifier 242 associated with private containers 200 specified by the build step instructions 300. Authorization will not occur without authentication.

When the user device 110 is authenticated and authorized, the container builder 160 executes the build step process 500 to build the output container 250 while using the received containers 200, 210 specified by the instructions 300. Referring to FIG. 4B, the container builder 160 uses a pull 416 call directed toward the container system 150 to obtain the one or more private containers 200 and the one or more public containers 210 specified in the build step instructions 300 for use by the build step process 500 in building the output container 250. In some examples, the build step process 500 executes the series of build steps 310 (e.g., Build Step A, Build Step B . . . Build Step N) associated with the build step instructions 300. Each build step 310 may execute using the private contents 202 and/or the public contents 212 from the corresponding containers 200, 210 to output/build a corresponding build result 225 used for building the output container 250. The build result 225 output/built during execution of one build step 310 may be used by one or more subsequent build steps 310. For instance, Build Step A may use a compiler 222*a* of a proprietary SDK 222 contained in one of the specified private containers 200 to compile source code into executable code packaged in a build result 225 and Build Step B may test the compiled source code included within the build result 225 output after execution of Build Step A.

The build step process 500 may employ one or more virtual machines to execute each build step 310 based on the order of execution defined by the build step instructions 300. In some implementations, the Build Step A executes upon the initiation of the build step process 500 and the Build Step B begins executing upon completion of the Build Step A 310. The build steps 310 may include dependency constraints 316 that require the build step process 500 to wait for the execution of one or more prior build steps 310 to complete before the commencing execution of the corresponding build step 310. In some examples, two or more build steps 310 may execute in parallel and output corresponding build results 225 that merge together to build the output container 250.

The build step process 500 outputs the built output container 250 after each build step 310 successfully completes executing. In some implementations, the container builder 160 performs a push operation 418 to push the built output container 250 to the container system 160 within the memory hardware 920. In some examples, the output container 250 is tagged with the output container identifier 320 that includes identification information for identifying the output container 250. For instance, the user 10 may use the output container identifier 320 to deploy the output container 250 from the container system 160. The contents 252 of the output container 250 may be associated with the software application 254 configured to execute on the remote system 140. The contents 252 may be owned by the user 10 and protected by the container 250 to prevent accessibility to the public. For example, the contents 252 may include an authorization identifier 242 that identifies one or more users 10 authorized to access the contents 252 of the container 250. Here, the container system 150 may use the authorization identifier 242 as permissions on the container system 150 for governing the authorization of access to the output container 250. In some implementations, the output container 250 may be specified in a subsequent set of build step instructions 300 to execute during a build step 310 of a subsequent build step process 500 that builds another output container 250. In some implementations, the output container 250 is tagged with a build step record 420 that indicates information associated with the build step process 500. For instance, the build step record 420 may include, without limitation, each build step 310 executed by the process 500, a usage of containers 200, 210 during each build step 310, the order of execution of the build steps 310, a start timestamp indicating a time when execution of each build step 310 began, an end timestamp ending a time when execution of each build step 310 completed, and the contents of each build result 225 output during execution of the build steps 310.

Figures 5A, 5B, 5C:
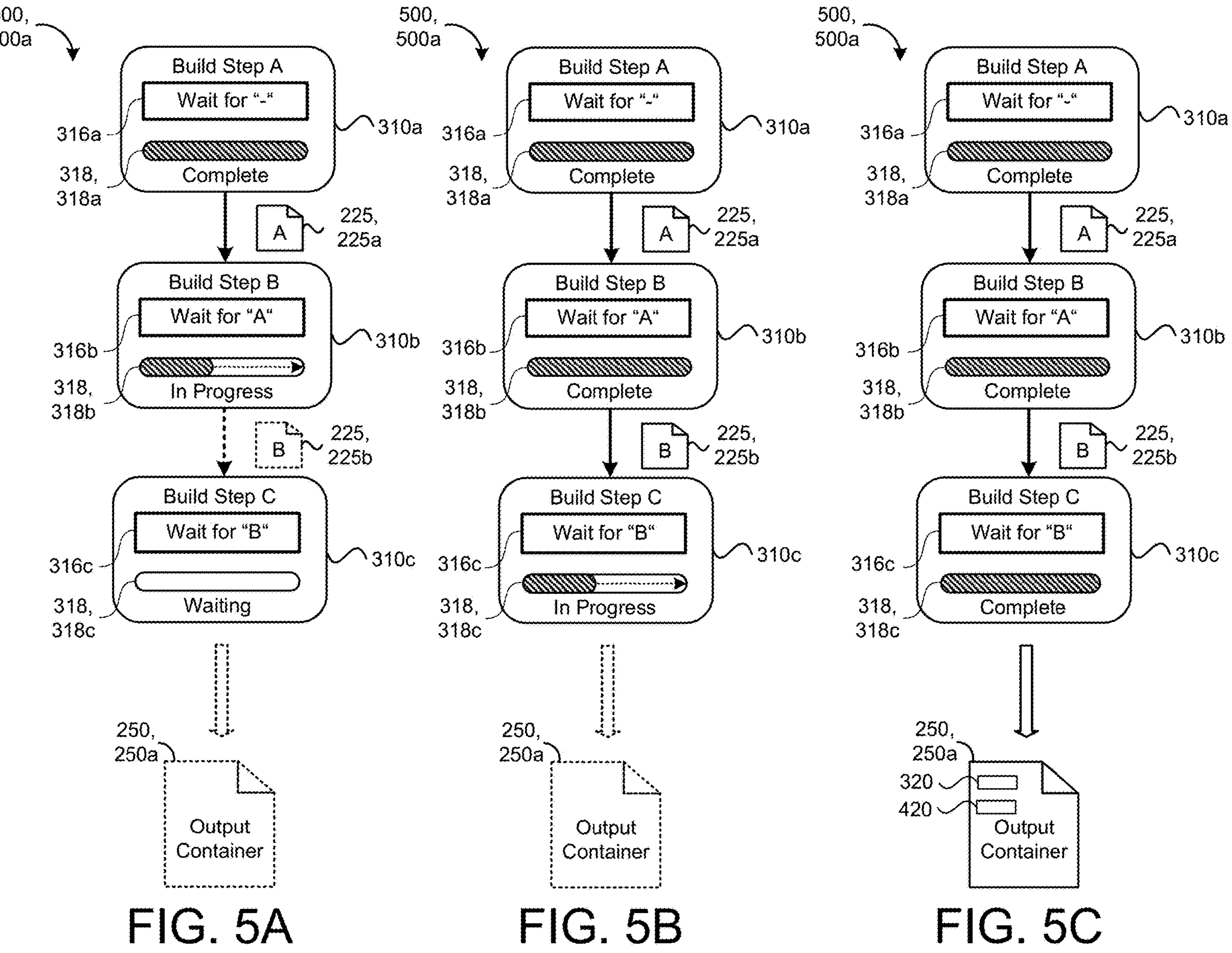
FIGS. 5A-5C show schematic views of an example build step process executing a series of build steps in succession to build an output container.

FIGS. 5A-5C show schematic views of an example build step process 500, 500*a* executing a series of build steps 310, 310*a*-*c* in succession for building an output container 250, 250*a*. For instance, the container builder 160 may receive a build request 170 containing build step instructions 300 that specify the series of build steps 310*a*-*c* required to execute for building the output container 250*a*. The dependency constraints 316, 316*a*-*c* associated with each build step 310*a*-*c* may collectively define the order of execution for executing the build steps 310*a*-*c* in succession such that each consecutive build step 310 commences executing after execution of an immediately prior build step 310 is complete. The build steps 310 may each include a corresponding status identifier 318, 318*a*-*c* each indicating an execution status for the corresponding build step 310. The status identifiers 318 may specify, without limitation, a status of "Complete", "In Progress", "Waiting", or "Failed". The "Complete" status identifier 318 indicates that execution of the corresponding step 310 is complete, the "In Progress" status identifier 318 indicates that the execution of the corresponding step 310 is in progress, i.e., the corresponding step 310 is currently executing, and the "Waiting" status identifier 318 indicates that the corresponding step 310 is waiting to execute. Upon execution of each build step 310 completing, the corresponding build step 310 may output a corresponding build result 225, 225*a*-*b* for use during execution of the next build step 310. The "Failed" status identifier 318 (not shown) indicates that execution of the corresponding step 310 has failed. As a result, the build step process 500 fails to successfully build the output container. The status provided by the status identifiers 318 may optionally be included in a status notification 704 (FIG. 7) sent to the user device 110 from the container builder 160.

FIG. 5A shows Build Step A 310*a* having a dependency constraint 316*a* equal to Wait_for "–" that results in the Build Step A 310*a* executing immediately upon initiation of the build step process 500*a*. The status identifier 318*a* indicates that the execution of the Build Step A 310*a* is complete. Accordingly, Build Step A 310*a* outputs a corresponding build result 225*a* that passes to Build Step B 310*b*. On the other hand, the status identifier 318*b* for Build Step B 310*b* indicates that Build Step B 310*b* is currently executing. Here, Build Step B 310*b* has a dependency constraint 316*b* equal to Wait_for "A" that results in the Build Step B 310*b* executing upon execution of Build Step A 310*a* completing. FIG. 5A shows Build Step C 310*c* having a dependency constraint 316*c* equal to Wait_for "B" that requires the Build Step C to wait for execution of Build Step B 310*b* to complete before execution of Build Step C 310*c* is permitted to commence. Thus, the example shows the status identifier 318*c* indicating that the Build Step C 310*c* is currently waiting to execute.

Referring to FIG. 5B, the build step process 500*a* completes executing Build Step B, i.e., status identifier 318*b* is "Complete", and Build Step B 310*b* outputs a corresponding build result 225*b* that passes to Build Step C 310*c*. The status identifier 318*c* for Build Step C 310*c* indicates that Build Step C 310*c* is currently executing. Referring to FIG. 5C, the build step process 500*c* completes executing all of the Build Steps A-C 310*a*-*c* and the corresponding output container 250*a* is output after Build Step C 310*c* completes executing. The output container 250*a* may be tagged with the output container identifier 320 and the build step record 420 including at least one of each build step 310 executed by the process 500, a usage of containers 200, 210 during each build step 310, the order of execution of the build steps 310, a start timestamp indicating a time when execution of each build step 310 began, an end timestamp ending a time when execution of each build step 310 completed, and the contents of each build result 225 output during execution of the build steps 310.

In some configurations, executing Build Step A 310*a* may be associated with executing a compiling build step to build executable code (e.g., build result 225*a*) of a software distribution (e.g., software application 254) from input source code 302 (FIG. 3) and executing Build Step B 310*b* may be associated with executing a unit test build step to determine whether the executable code 225*a* satisfies operation requirements of the software distribution 254. Accordingly, executing Build Step C 310*c* may be associated with executing a packaging build step that packages the executable code 225*a* into a deployment container (e.g., output container 250*a*). Here, the Build Step C 310*c* may only execute to package the executable code 225 when the unit test build step (e.g., Build Step B 310*b*) determines the executable code satisfies the operation requirements. In some examples, the deployment container 250*a* contains a runtime environment for executing the executable code while excluding the SDK 222. Thus, the deployment container 250*a* may be associated with a "lean" container that does not contain the bulk of various build time tools (e.g., compilers, debuggers, etc).

Figures 6A, 6B:
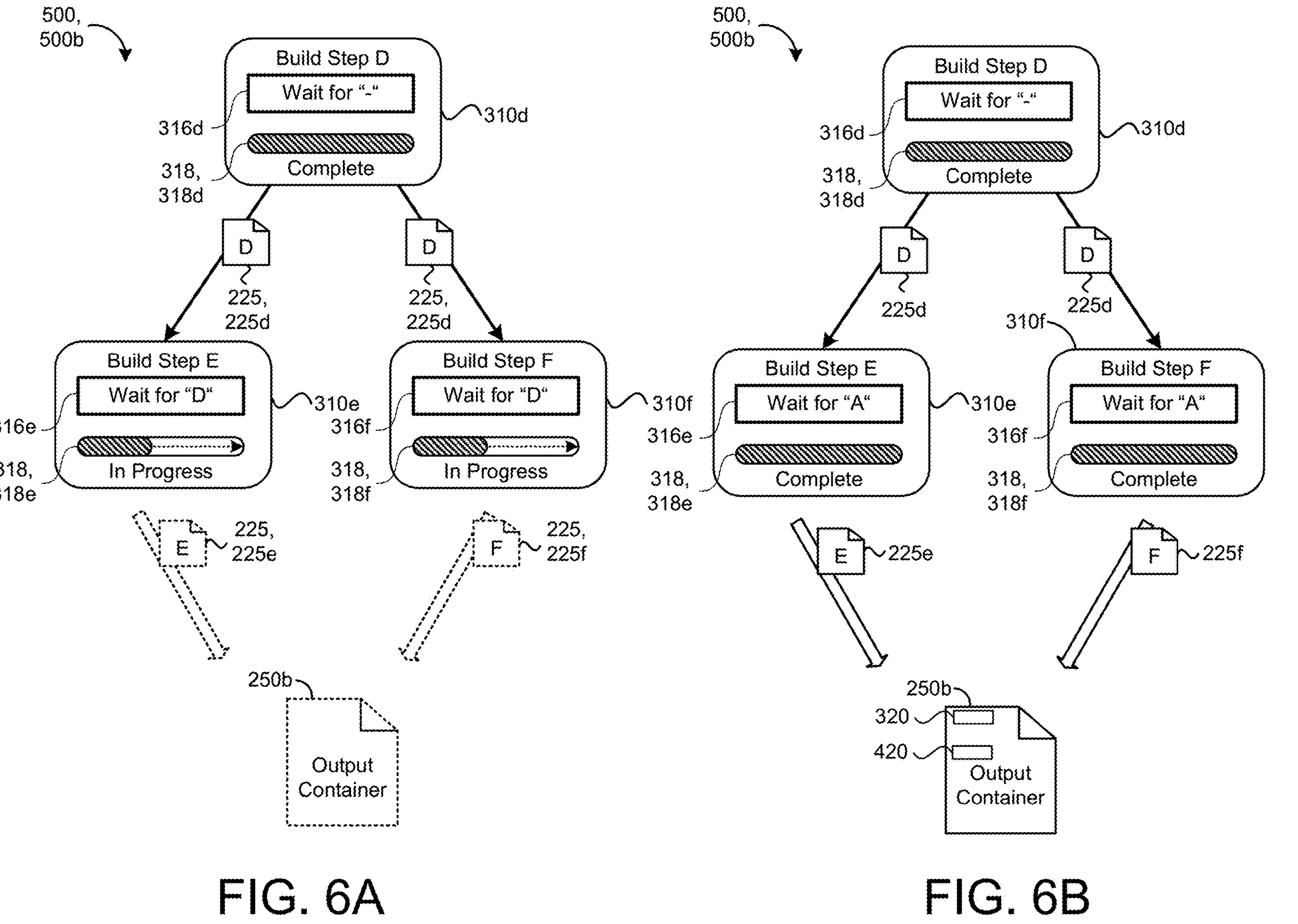
FIGS. 6A and 6B show schematic views of an example build step process executing two build steps of a series of build steps in parallel to build an output container.

FIGS. 6A and 6B show schematic views of an example build step process 500, 500*b* executing at least two of a series of build steps 310, 310*d-f* in parallel for building an output container 250, 250*b*. For instance, the container builder 160 may receive a build request 170 containing build step instructions 300 that specify the series of build steps 310*d-f* required to execute for building the output container 250*b*. The dependency constraints 316, 316*d-f* associated with each build step 310*d-f* may collectively define the order of execution for executing the build steps 310*d-f* such that Build Step D 310*d* commences executing when the build step process 500*b* initiates and Build Steps E and F 310*e*, 310*f*, respectively, execute in parallel after execution of the build Step D 310*d* is complete.

FIG. 6A shows Build Step D 310*d* having a dependency constraint 316*d* equal to Wait_for "–" that results in the Build Step D 310*d* executing immediately upon initiation of the build step process 500*b*. The status identifier 318*d* indicates that the execution of the Build Step D 310*d* is complete. Accordingly, Build Step D 310*d* outputs a corresponding build result 225*d* that passes to at least one of Build Steps E 310*e* and F 310*f*. On the other hand, the status identifier 318*e* for Build Step E 310*e* and the status identifier 318*f* for Build Step 310*f* each indicate that the corresponding Build Steps E 310*e* and F 310*f* are currently executing, e.g., "In Progress". Here, the Build Steps E 310*e* and F 310*f* each include a same corresponding dependency constraint 316*e*, 316*f* equal to Wait_for "D" that results in the Build Steps E 310*e* and F 310*f* executing in parallel upon execution of Build Step D 310*d* completing.

Referring to FIG. 6B, the build step process 500*b* completes executing Build Step E 310*e* and Build Step 310*f*, i.e., status identifiers 318*e*, 318*f* are "Complete", and Build Step E 310*e* outputs a corresponding build result 225*e* and Build Step F 310*f* outputs a corresponding build result 225*f* that merge to build the output container 250*b*. The output container 250*b* may be tagged with the output container identifier 320 and the build step record 420 including at least one of each build step 310 executed by the process 500, a usage of containers 200, 210 during each build step 310, the order of execution of the build steps 310, a start timestamp indicating a time when execution of each build step 310 began, an end timestamp indicating a time when execution of each build step 310 completed, and the contents of each build result 225 output during execution of the build steps 310.

Figure 7:
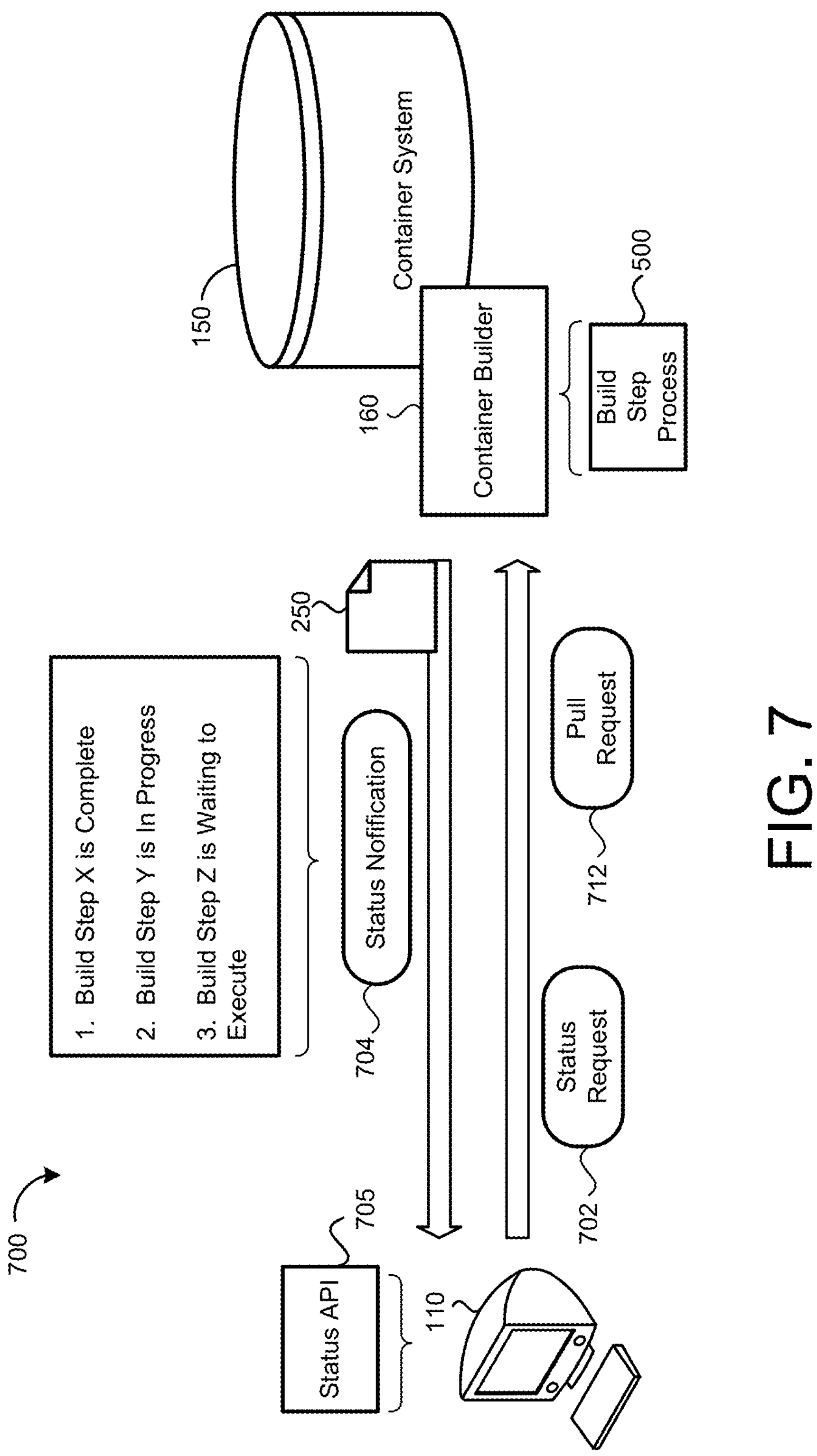
FIG. 7 is a schematic view of a container builder transmitting a status notification indicating a status of a series of build steps for use in building an output container.

FIG. 7 shows a schematic view 700 of the container builder 160 receiving a status request 702 and/or a pull request 712 from the user device 110 after the user device 110 initiates the build request 170 and is authorized and authenticated. In some examples, the user device 110 executes a status API 705 configured to transmit the status request 702 and/or the pull request 712 to the container builder 160. In some configurations, the status request 702 requests a status of each of a series of build steps 310 (e.g., Build Step X, Build Step Y, Build Step Z) associated build step instructions 300 included in the previously transmitted build request 170. The status request 702 may include an identifier identifying a previous build request 170, build step instructions 300 associated with the previous build request 170, or an output container identifier 320 identifying the output container 250 associated with the series of build steps 310. The container builder 160 obtains the status of each of the build steps 310 in response to receiving the status request 702 and transmits a status notification 704 to the user device 110. The example shows the status notification 704 indicating Build Step X is "Complete", Build Step Y is "In Progress", and Build Step Z is "Waiting to Execute". The status notification 704 may indicate a status of "Execution Failed" when a corresponding build step 310 fails to successfully execute. Accordingly, the status of each corresponding build step 310 provided in the status notification 704 indicates at least one of execution of the corresponding build step 310 is complete, execution of the corresponding build step 310 has failed, execution of the corresponding build step 310 is currently in progress, or the corresponding build step 310 is waiting to execute. In some examples, the user device 110 is permitted to cease/terminate execution of the build step instructions 300 or one or more build steps 310 specified by the build step instructions 300.

In other configurations, the status request 702 requests a status of a build step process 500 associated with build step instructions 300 included in the previously transmitted build request 170. Here, the container builder 160 may obtain the status of the build step process 500 in response to receiving the status request 702 and transmit the status notification 704 to the user device 110. In these configurations, the status of the previous build step provided by the status indicates one of execution of the previous build step process 500 successfully completed (i.e., successful built the corresponding output container 250), execution of the previous build step process 500 is currently in progress, or execution of the previous build step process 500 has failed.

In some implementations, the user device 110 initiates the pull request 712 to view a built output container 250 to determine whether the output container 250 runs/executes properly on the user device 110 before distributing the output container 250 to the public. In some examples, the pull request 712 includes the output container identifier 320 associated with the output container 250 and the container builder 160 uses the output container identifier 250 to retrieve the output container 250 from the container system 160 for transmission to the user device 110. The user device 110 may execute the output container 250 in response to receiving the output container 250 from the container manager 160.

Figure 8:
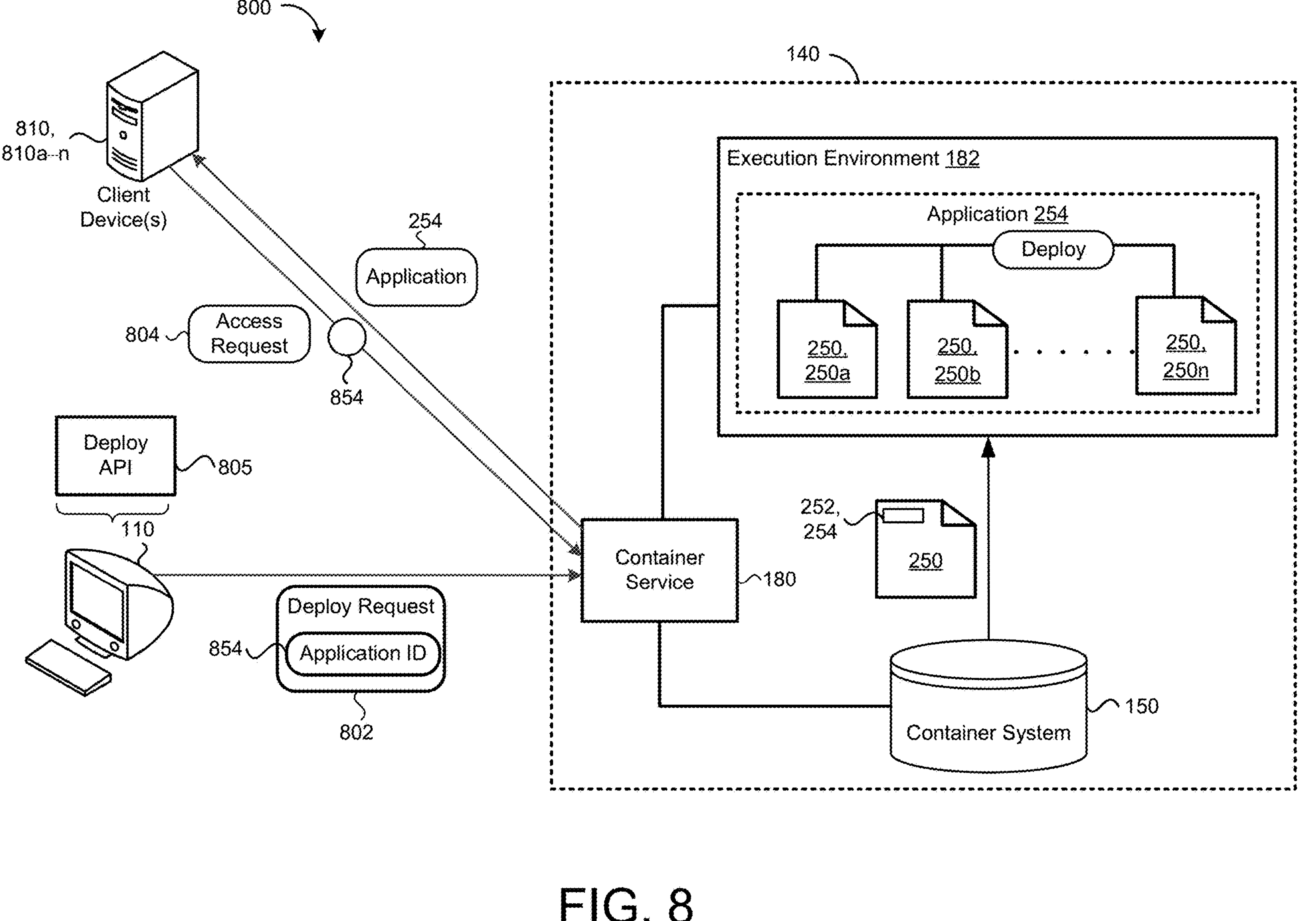
FIG. 8 is a schematic view of a remote system executing a container system and an execution environment for contents of one or more built output containers associated with a software application.

FIG. 8 shows a schematic view 800 of the remote system 140 executing the container system 150 and an execution environment for the contents 252 of one or more built output containers 250, 250*a-n* associated with a software application 254. The user device 110 may push 418 (FIG. 4B) each built output container 250 after successfully executing a corresponding build step process 500 into the container system 150. In some implementations, the remote system 140 executes a container service 180 that manages execution of the execution environment 182 for running the software application 254 and distributing the software application 254 to one or more client devices 810, 810*a-n* in communication with the remote system 140, e.g., via the container service 180. The client devices 810 can be any computing device capable of communicating with the container service 180, such as, but not limited to, desktop computing devices and mobile computing devices, such as laptops, tablets, smart phones, and wearable computing devices (e.g., headsets and/or watches).

In some implementations, the user device 110 executes a deploy API 805 that permits the user device 110 to transmit a deploy request 802 to the container service 180 for obtaining one or more output containers 250 from the container system 150 to execute the corresponding software application 254 in the execution environment 182. In some examples, the execution environment 182 is a secure execution environment 182 configured to protect the contents 252 of one or more output containers 250 from disclosure or modification during execution of the software application 254. One or more virtual machines may execute the software application 254 in the execution environment 182. The deploy request 802 may include an application identifier 854 associated with the software application 254 and the container service 180 may use the application identifier 854 to obtain each output container 250 having corresponding contents 252 associated with the software application 254.

In some examples, the container service 180 receives an access request 804 from one or more of the client devices 810 to obtain the software application 254. The access request 804 may include the application identifier 854 associated with the software application 254. Thereafter, the container service 180 may distribute the one or more output containers 250 associated with the software application 254 to the client devices 810. Accordingly, the client devices 810 may run the software application 254 locally while the software application 254 executes in the execution environment 182 on the remote system 140. Advantageously, the secure execution environment 182 allows for scaling of the software application 254 by creating replicas of one or more of the corresponding output containers 250 and enables the one or more client devices 810 to execute the application 254 regardless of the operating system executing on the client devices 810. The container service 180 may further communicate with the user device 110 to provide updates to the application 254 by adding/removing new/old output containers 250 for execution in the execution environment 182.

FIG. 9 is a schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosure described and/or claimed in this document.

The computing device 900 includes a processor 910 (e.g., data processing hardware), memory 920, a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 (e.g., memory hardware) stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 530 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900*a* or multiple times in a group of such servers 900*a*, as a laptop computer 900*b*, or as part of a rack server system 900*c*.

In some implementations, the computing device 900 implementing the container builder 160 or container service 190 is in communication with memory hardware in the memory 920 for implementing the container system 150 having private containers 200 including private contents 202 and public containers 210 including public contents 212. The processor 910 executes the container builder 160 and the container service 190. For example, the container builder may receive a build request 170 containing build step instructions 300 from a user device 110. The instructions may specify a usage of the containers 200, 210 for building an output container 250. In some implementations, the container builder 160 authenticates the user initiating the build request and determines whether a user 10 associated with the user device 110 is authorized to access the private containers 200. In these implementations, when the user 10 is authenticated and authorized to access the private containers, the container builder 160 obtains containers 200, 210 specified by the build step instructions from the memory hardware in the memory 920, executes the build step instructions 300 to build the output container 300 while using the obtained containers 200, 210, and outputs the build output container 250.

Figure 10:
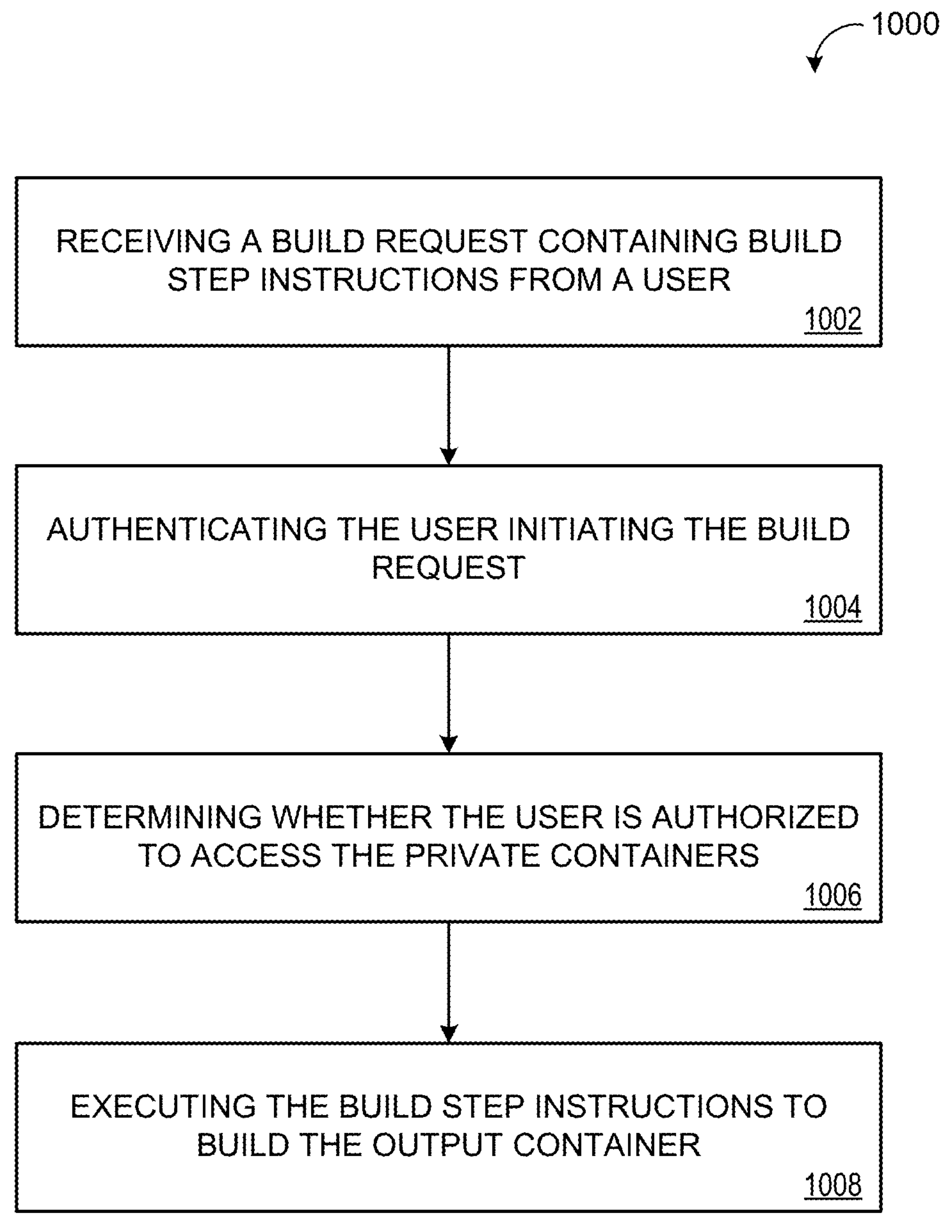
FIG. 10 is a flowchart of an example method for building an output container.

FIG. 10 is a flowchart of an example method 1000 executed on the computing device 900 of FIG. 9 for building an output container 250. The flowchart starts at operation 1002 when the computing device 900 (e.g., data processing hardware) of the remote system 140 receives a build request 170 containing build step instructions 170 from a user 10 (e.g., user device 110). The build step instructions 300 specify a usage of containers 200, 212 within a container system within memory hardware for building the output container 250. The containers include at least one private container 200 having private contents 202 and/or at least one public container 210 having public contents 212. The at least one private container 200 requires a user authorization for accessing the private contents 212.

At operation 1004, the computing device 900 authenticates the user 10 initiating the build request 170 and determines, at operation 1006 whether the user is authorized to access the private containers 200. At operation 1008, when the user 10 is authenticated and authorized to access the private containers 200, the computing device 900 obtains the containers 200, 210 from the container system in the memory hardware, executes the build step instructions 300 to build the output container 250 while using the obtained containers 200, 210, and outputs the built output container 250. In some examples, the computing device 900 stores the built output container 250 in the container system 150.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:

receiving, from a user device associated with a user, a build request comprising build step instructions comprising a series of build steps for building an output container and specifying a usage of a private container, wherein at least one build step of the series of build steps comprises a dependency constraint specifying a prior build step that must complete execution before commencing execution of the at least one build step;

determining that the user is authorized to access the private container;

based on determining that the user is authorized to access the private container, executing the build step instructions to build the output container; and outputting the output container to a container system.

2. The method of claim 1, wherein each respective build step of the series of build steps comprises at least one of:

a container identifier; or an environment field.

3. The method of claim 2, wherein the dependency constraint of the at least one build step further specifies the container identifier of the prior build step.

4. The method of claim 1, wherein each respective build step of the series of build steps comprises a status identifier indicating an execution status for the respective build step.

5. The method of claim 1, wherein executing the build step instructions uses one or more virtual machines.

6. The method of claim 1, wherein the built output container comprises a build step record comprising the series of build steps of the build step instructions and an order of execution of the series of build steps.

7. The method of claim 6, wherein the build step record further comprises start timestamps, each of the start timestamps corresponding to a start time when execution of a respective build step began.

8. The method of claim 6, wherein the build step record further comprises end timestamps, each of the end timestamps corresponding to an ending time when execution of a respective build step completed.

9. The method of claim 1, wherein the build step instructions further specify a usage of a public container.

10. The method of claim 9, wherein each build step of the series of build steps uses one of the private container or the public container.

11. A system comprising:

data processing hardware; and memory hardware in communication with the data processing hardware, the memory hardware storing instructions that when executed cause the data processing hardware to:

receive, from a user device associated with a user, a build request comprising build step instructions comprising a series of build steps for building an output container and specifying a usage of a private container, wherein at least one build step of the series of build steps comprises a dependency constraint specifying a prior build step that must complete execution before commencing execution of the at least one build step;

determine whether the user is authorized to access the private container;

responsive to determining that the user is authorized to access the private container, execute the build step instructions to build the output container; and output the output container to a container system.

12. The system of claim 11, wherein each respective build step of the series of build steps comprises at least one of:

a container identifier; or an environment field.

13. The system of claim 12, wherein the dependency constraint of the at least one build step further specifies the container identifier of the prior build step.

14. The system of claim 11, wherein each respective build step of the series of build steps comprises a status identifier indicating an execution status for the respective build step.

15. The system of claim 11, wherein to execute the build step instructions, the instructions cause the data processing hardware to use one or more virtual machines.

16. The system of claim 11, wherein the output container comprises a build step record comprising the series of build steps of the build step instructions and an order of execution of the series of build steps.

17. The system of claim 16, wherein the build step record further comprises start timestamps, each of the start timestamps corresponding to a start time when execution of a respective build step began.

18. The system of claim 16, wherein the build step record further comprises end timestamps, each of the end timestamps corresponding to an ending time when execution of a respective build step completed.

19. The system of claim 11, wherein build step instructions further specify a usage of a public container.

20. The system of claim 19, wherein each build step of the series of build steps uses one of the private container or the public container.

* * * * *